(12) United States Patent
Knight

(10) Patent No.: US 6,325,684 B1
(45) Date of Patent: Dec. 4, 2001

(54) TROLLING MOTOR STEERING CONTROL

(75) Inventor: Steven J. Knight, Madison Lake, MN (US)

(73) Assignee: Johnson Outdoors, Inc.,, Sturtevant, WI (US)

( * ) Notice: Subject to any disclaimer, the term of this patent is extended or adjusted under 35 U.S.C. 154(b) by 0 days.

(21) Appl. No.: 09/590,914

(22) Filed: Jun. 9, 2000

Related U.S. Application Data
(60) Provisional application No. 60/138,890, filed on Jun. 11, 1999.

(51) Int. Cl.⁷ .................................................. B60L 11/02
(52) U.S. Cl. ......................................... 440/6; 114/144 RE
(58) Field of Search .................. 440/6, 7, 1; 114/144 R, 114/144 RE; 364/444, 424.01

(56) References Cited

U.S. PATENT DOCUMENTS

| | | |
|---|---|---|
| 2,804,838 | 9/1957 | Moser . |
| 3,598,947 | 8/1971 | Osborn ................................ 200/86.5 |
| 3,807,345 | 4/1974 | Peterson ............................. 115/18 E |
| 3,980,039 | 9/1976 | Henning . |
| 3,989,000 | 11/1976 | Foley, Jr. ........................... 115/18 E |
| 3,995,579 | 12/1976 | Childre . |
| 4,151,807 | 5/1979 | Black, Jr. ............................... 114/153 |
| 4,527,983 | 7/1985 | Booth ....................................... 440/7 |
| 4,631,034 | 12/1986 | Menne et al. . |
| 4,824,408 | 4/1989 | Aertker et al. . |
| 4,841,203 | 6/1989 | Gilbert . |
| 5,069,642 | 12/1991 | Henderson . |
| 5,078,070 | 1/1992 | Clement . |
| 5,107,424 | * 4/1992 | Bird et al. ....................... 364/424.01 |
| 5,152,703 | 10/1992 | Clement . |
| 5,171,173 | 12/1992 | Henderson et al. . |
| 5,180,925 | 1/1993 | Lieb . |
| 5,465,633 | 11/1995 | Bernloehr .............................. 74/512 |
| 5,470,264 | 11/1995 | Eick ....................................... 440/83 |
| 5,523,951 | * 6/1996 | Kriesgman et al. ................. 364/444 |
| 5,892,338 | 4/1999 | Moore et al. . |

OTHER PUBLICATIONS

Bass Pro Shops 1997 Catalog, pp. 319–328, Expiration Date: Feb. 1, 1998.
JWA Informational Brochure, pps. 1–52, ©1996.
Motor Guide 2000 Catalog, pps. 1–24, ©1999.

* cited by examiner

*Primary Examiner*—Jesus D. Sotelo
(74) *Attorney, Agent, or Firm*—Foley & Lardner

(57) ABSTRACT

A steering control system for an electric trolling motor is disclosed. The system includes a steering actuator assembly with at least one open loop actuator. The system also includes at least one steering mode switch that is configured to communicate changes between steering modes. The steering modes include at least one closed loop steering mode and at least one manual steering mode. The system further includes a controller that is configured to receive signals from the open loop actuator, is configured to receive signals from at least one steering mode switch, and is configured to generate control signals based on the states of the open loop actuator and the steering mode switch.

22 Claims, 2 Drawing Sheets

TROLLING MOTOR STEERING CONTROL

REFERENCE TO RELATED APPLICATION

The present application claims the benefit of U.S. Provisional patent application Ser. No. 60/138,890 entitled TROLLING MOTOR, filed on Jun. 11, 1999 by Darrel A. Bernloehr et al. The present application is also related to co-pending U.S. patent application Ser. No. 09/592,023 entitled TROLLING MOTOR SYSTEM, filed on Jun. 12, 2000 by Steven J. Knight et al.; U.S. patent application Ser. No. 09/1592,242 entitled TROLLING MOTOR BOW MOUNT IMPACT PROTECTION SYSTEM, filed on Jun. 13, 2000 by Steven J. Knight et al.; U.S. patent application Ser. No. 09/591,862 entitled TROLLING MOTOR FOOT CONTROL WITH FINE SPEED ADJUSTMENT, filed on Jun. 12, 2000 by Steven J. Knight; U.S. patent application Ser. No. 09/592,923 entitled TROLLING MOTOR PROPULSION UNIT SUPPORT SHAFT, filed on Jun. 13, 2000 by Steven J. Knight et al.; U.S. patent application Ser. No. 09/590,921 entitled TROLLING MOTOR BATTERY GAUGE, filed on Jun. 9, 2000 by Steven J. Knight, U.S. patent application Ser. No. 29/124,838 entitled TROLLING MOTOR FOOT PAD BASE, filed on Jun. 13, 2000 by Steven J. Knight et al.; U.S. patent application Ser. No. 29/124,860 entitled TROLLING MOTOR FOOT PAD PEDAL, filed on Jun. 13, 2000 by Steven J. Knight et al.; U.S. patent application Ser. No. 29/124,846 entitled TROLLING MOTOR MOUNT, filed on Jun 13, 2000 by Ronald P. Hansen; U.S. patent application Ser. No. 29/124,847 entitled TROLLING MOTOR PROPULSION UNIT SUPPORT SHAFT, filed on Jun. 13, 2000 by Steven J. Knight et al.; U.S. patent application Ser. No. 09/593,075 entitled TROLLING MOTOR BOW MOUNT, filed on Jun. 13, 2000 by Steven J. Knight et al.; and U.S. patent application Ser. No. 29/124,859 entitled TROLLING MOTOR MOUNT, filed on Jun. 13, 2000 by Ronald P. Hansen; the full disclosures of which, in their entirety, are hereby incorporated by reference.

FIELD OF THE INVENTION

The disclosure relates to an electronic power steering system for a battery-powered electric trolling motor of the type which is commonly mounted to the bow of a fishing boat. Further, the disclosure relates to an electronic power steering system for an electric trolling motor which combines the selective and integrated use of open-loop and closed-loop systems, providing the advantages of both open-loop and closed-loop systems.

BACKGROUND OF THE INVENTION

Fishing boats and vessels are often equipped with a trolling motor for providing a relatively small amount of thrust to slowly and quietly propel the boat or vessel while the operator is fishing. The motor is typically mounted to the bow of the boat (alternatively, the motor may be mounted at other locations in the boat, for example the motor may be transom mounted at the stern of the boat) so that the thrust pulls the boat through the water.

Some existing trolling motors include mechanical cable linkages between a foot pedal or steering control and a mechanical steering system (e.g., rack and pinion) in a steering head. The operator provides the physical force for turning the lower unit of the motor via the linkages. In such systems, the rotary motion of the foot pedal or other steering control is mechanically converted to rotary motion of a prop motor or propulsion unit. Such mechanical systems, however, require relatively bulky cable linkages, and do not have the flexibility provided by electronic steering control systems. Other existing trolling motors have an electric power steering system wherein an electric steering motor is used to rotate the trolling motor lower unit to steer the boat. Such systems use either "open-loop steering control" or "closed-loop steering control" ("feedback steering"). In one open-loop system, the foot pedal assembly includes a pair of switches and when the user pushes the right (left) side of the foot pedal, the first (second) switch is closed to actuate a steering motor to cause the lower unit to turn to the right (left) for as long as a first (second) switch is held closed. In one closed-loop system, the foot pedal assembly includes a potentiometer for sensing the rotational position of the foot pedal and generating a steering command signal representative thereof, and the trolling motor includes a potentiometer for sensing the rotational position of the prop motor, and an electronic controller for controlling the steering motor based on the difference between the steering command and feedback signals.

Although both types of existing electric "power steering" systems avoid the need for bulky mechanical steering linkages, and provide flexibility through electronic control, each can be advantageous over the other in certain situations. Closed-loop systems provide the obvious advantage of acting like mechanical systems since the steer direction depends on the rotational position of the foot pedal. However, in situations in which the user wishes to make a fine adjustment to the steering direction, relationship between foot pedal position (which may have a total range of only 45 degrees, or +/−22.5 degrees) and prop position (which may have a total range of 360 degrees) may yield a high steering ratio (e.g., 8;1), which can make fine adjustments difficult to achieve. For example, if the user wants to make only a 4 degree adjustment, he needs to rotate the pedal by only 0.5 degrees. This resolution can be difficult to achieve using foot control, which is not as accurate as hand control, and can be difficult to achieve in a bouncing and pitching boat. In this situation, open-loop systems may be preferred since a user merely has to tap the left or right steering switch with his foot to cause a prop to rotate at a predetermined rate (e.g., 5 degrees per second). In the example, the user could achieve the 4 degree turn merely by tapping the left or right switch for 0.8 seconds, which is relatively easy. Thus, both open-loop and closed-loop steering systems can be disadvantageous under certain conditions.

Accordingly, there is a need for an electronic power steering system for a trolling motor wherein features of both open and closed-loop steering systems are combined to provide a single steering system having advantages of both open and closed-loop steering systems.

SUMMARY OF THE INVENTION

An exemplary embodiment relates to a steering control system for an electric trolling motor. The system includes a steering actuator assembly, including at least one open loop actuator. The system also includes at least one steering mode switch configured to communicate changes between steering modes. The steering modes include at least one closed loop steering mode and at least one manual steering mode. Further, the system includes a controller, configured to receive signals from the open loop actuator, configured to receive signals from the at least one steering mode switch, and configured to generate control signals based on the states of the open loop actuator and the steering mode switch.

Another exemplary embodiment relates to an electric trolling motor. The electric trolling motor includes a propulsion unit configured to provide thrust and having a motor. The electric trolling motor also includes a steering head, coupled to the propulsion unit and having a steering motor for steering the prop motor. Further, the electric trolling motor includes a steering actuator assembly, including at least one open loop actuator. Further still, the electric trolling motor includes at least one steering mode switch configured to communicate changes between steering modes. The steering modes include at least one closed loop steering mode and at least one manual steering mode. Yet further still, the electric trolling motor includes a controller, configured to receive signals from the open loop actuator, configured to receive signals from the at least one steering mode switch, and configured to generate control signals based on the states of the open loop actuator and the steering mode switch and applying the control signals to the steering motor.

Yet another exemplary embodiment relates to a steering control system for an electric trolling motor. The system includes a foot pedal assembly, including at least one foot pedal for manual steering. The system also includes a foot presence switch configured to provide a signal representative of the presence of an operator's foot. Further, the system includes at least one steering mode switch configured to communicate changes between steering modes. The steering modes include at least one closed loop steering mode and at least one manual steering mode. Further still, the system includes a controller, configured to receive signals from the open loop actuator, configured to receive signals from the at least one steering mode switch, configured to receive a signal representative of the presence of an operator's foot, and configured to generate control signals based on the states of the open loop actuator and the steering mode switch.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF EXEMPLARY EMBODIMENTS

Figure 1:
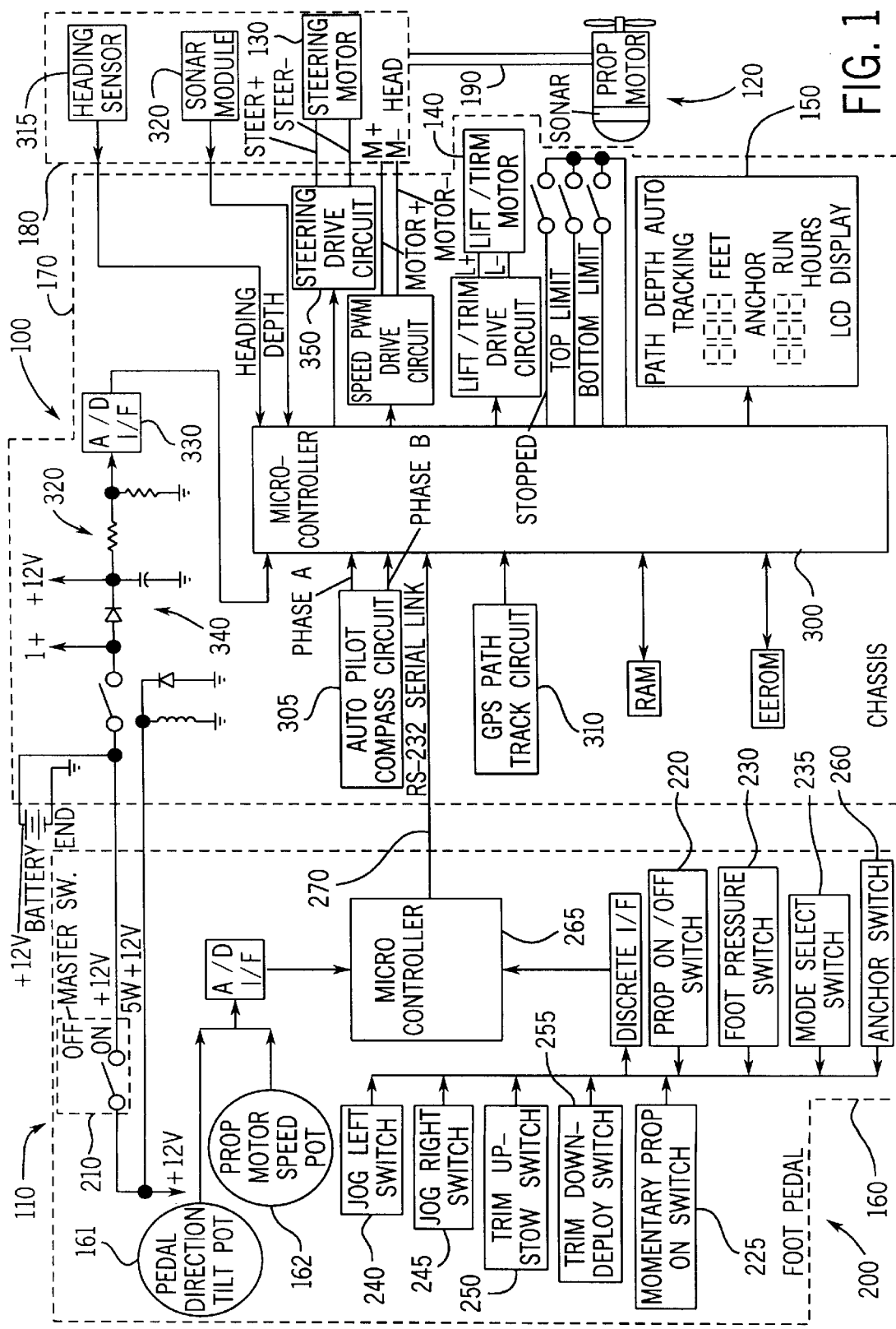
FIG. 1 is a block diagram of an exemplary embodiment of a trolling motor system.

Referring to FIG. 1, a trolling motor system 100, is depicted. Trolling motor system 100 includes a battery 110 for providing electric power to a prop motor 120, a steering motor 130, a lift motor 140, and a display 150. Trolling motor system 100 also includes a foot pedal assembly 160 with input devices for controlling the operation of trolling motor system 100. Trolling motor system 100 further includes a chassis 170 for mounting trolling motor system 100 to a boat. Further still, trolling motor system 100 includes a head 180 coupled to prop motor 120 via a rotatable shaft 190.

In an exemplary embodiment, battery 110 is a 12 volt lead-acid marine battery with limited capacity (typically 105 amp-hours). Also, in an exemplary embodiment, foot pedal assembly 160 includes a pedal direction (tilt) potentiometer 161 for sensing the rotational position of a foot pad used to set a desired steering direction. Foot pedal assembly 160 also includes a prop motor speed potentiometer 162 for sensing the rotation of an actuatable knob used to select a prop motor speed.

Further, in an exemplary embodiment, foot pedal assembly 160 includes ten actuatable switches 200. Switches 200 include a master switch 210 used to control a relay in the chassis which, in turn, controls application of power from the battery to the rest of system 100. Other switches include, a prop on/off switch 220 for turning the prop on and off; a momentary prop on switch 225 for turning the prop on momentarily; a foot presence switch 230 which indicates whether the operator's foot is on or off foot pedal assembly 160; a mode select switch 235 for selecting an operating mode; a jog left switch 240 for allowing a user to make small or large corrections to the desired bearing, jog left switch 240 being a momentary switch which operates steering motor 130 at a reduced speed; a jog right switch 245 which allows a user to make small or large corrections to the desired bearing, jog right switch 245 being a momentary switch which operates steering motor 130 at a reduced speed; a trim-up stow switch 250, which is a momentary switch allowing upward trim of the motor or stowage of the motor; a trim down-deploy switch 255 providing trim down of the motor or deployment of the motor if stowed; and an anchor switch 260 configured to toggle on or off the power anchor function.

Foot pedal assembly 160 also includes a micro-controller 265 that is configured to read the settings of potentiometers 161 and 162 and switches 200 (except in an exemplary embodiment, for the master power switch), and is configured to communicate data representative of switch 200 positions via a serial communications link 270 to chassis 170. Any of a variety of configurations to communicate information from foot pedal 160 may be used, including, but not limited to, serial link 270, which is shown as an RS-232 communications link, however other configurations such as parallel communications links, and the like, may also be used.

Chassis 170 houses a motherboard including a second micro-controller 300 which is configured to receive input data from foot pedal 160 along serial link 270. Micro-controller 300 is also configured to receive signals from an auto pilot compass circuit 305 and a global positioning system (GPS) path track circuit 310 in chassis 170. Micro-controller 300 further is configured to receive heading and depth signals from a heading sensor 315 and a sonar module 320 which are mounted in head 180. Chassis micro-controller 300 is configured to execute appropriate control algorithms to process various inputs, generate control signals for controlling the steering motor 130, lift/trim motor 140, and prop motor 120, via appropriate output drive circuits. In an exemplary embodiment, micro-controller 300, which has access to random access memory (RAM) and electronically erasable programmable read only memory (EEPROM), also generates control signals to produce visible indicia, such as, but not limited to, compass direction and speed, on LCD display 150.

Trolling motor system 100 also includes a trolling motor steering control which includes foot pedal assembly 160 having a pivotal foot pedal coupled to potentiometer 161 for setting a desired steering direction, as well as momentary right jog switch 245 and momentary left jog switch 240, which are used to cause right and left steering for as long as the respective switch is held. Combining the advantages of "feedback" closed-loop steering and "momentary" switch-type open-loop steering in a single steering system is advantageous. Trolling motor steering control system also facilitates the integration of different trolling motor steering modes (e.g., manual steering, auto pilot, depth tracking, GPS path tracking) into a single trolling motor system. The steering system also includes a switch 230 for sensing the presence of the operator's foot on the pedal. Because fisherman typically need both hands for casting, reeling, and other fishing functions, an exemplary embodiment includes pedal assembly 160 to allow the fisherman to control the steering and speed of prop motor 120 with his feet, leaving his hands free. In an alternative embodiment, switch 230 is unnecessary as software in micro-controller 265 or 300 may be used to monitor the movement of the foot pedal on pedal assembly 160 in determining the effective presence of the foot. Further, it should be noted that operator steering controls of the foot pedal type are advantageous but not limiting. Other controls, such as, but not limited to hand controls may also be used.

Figure 2:
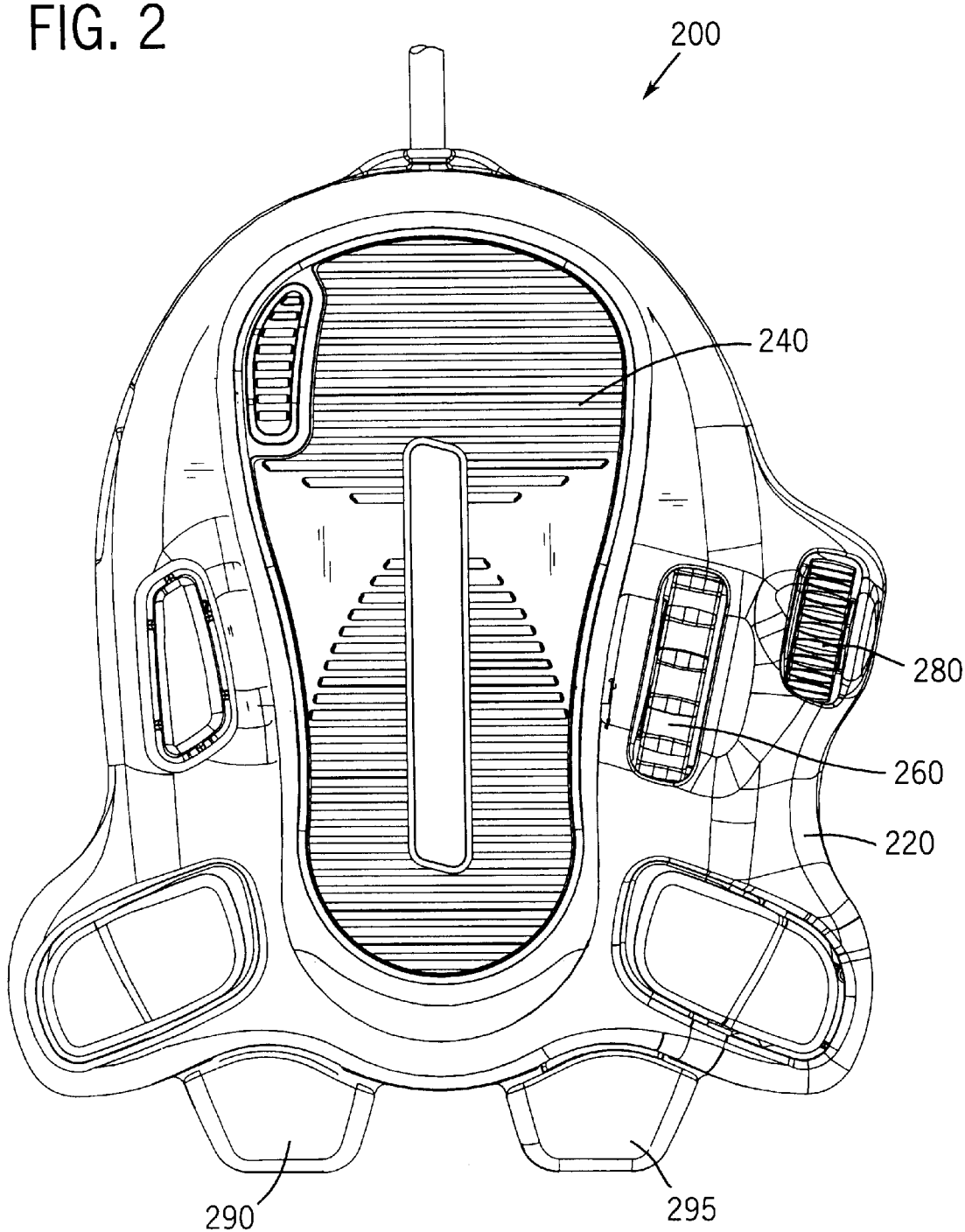
FIG. 2 is an exemplary diagram of a foot pedal assembly.

Referring now to FIG. 2, a trolling motor foot pad 200 is depicted. Foot pad 200 is an integral feature of foot pedal assembly 160. Foot pad 200 includes foot pad base 220, foot pedal 240, and fine speed adjustment knob 280. Trolling motor foot pad 200 is used to control various functions of a trolling motor from a remote location in the boat. FIG. 2 depicts fine speed adjustment knob 280 that is used to make incremental changes to power output of the trolling motor. Often, the fisherman wish to make a small adjustment to the speed of the boat that cannot be effectively done by using standard speed adjustment knob 260. One revolution of standard speed adjustment knob 260 varies motor speed from 0–100%. One revolution of fine speed adjustment knob 280 will vary the motor speed by 10%. This is effected by coupling fine speed adjustment knob 280 to standard speed adjustment knob 16 using a 10 to 1 gear reduction arrangement. The method of coupling the two controls may vary, using a belt, gear, or other means to effect the gear reduction, or by electronically compensating for the turning of one knob or the other. Further, foot pad 200 includes a jog left switch 290 and a jog right switch 295, which are momentary switches as described above.

The electric power steering system includes foot pedal assembly 160 for electric trolling motor 100. Foot pedal assembly 160 includes a foot pedal pivotable about an axis for steering prop motor 120. Foot pedal assembly 160 also includes a sensor (e.g., a potentiometer) 162 coupled to the pedal for sensing the rotational position thereof. A momentary jog right switch 245 may be used for steering slowly to the right when held. A momentary jog left switch 240 may be used for steering slowly to the left while held. A foot presence switch 230 (e.g., a micro-switch below a foot pad on the pedal) which is closed whenever the operator's foot is on the pedal, may be incorporated into the system. Further, a mode switch 235 for selecting a desired steering mode (e.g., manual steering, auto pilot, depth tracking, GPS path tracking) may also be utilized. Potentiometer 162 position and switch 240, 245, 235, 230 states are read by a control circuit or controller such as, the combined controllers 265 and 300 which, by executing algorithms, generate control signals applied to steering motor 130 via an output steering drive circuit 350.

The operation of the controller is as follows. Whenever foot presence switch 230 indicates that a user's foot is on pedal assembly 160 (or alternatively software monitoring potentiometer 162), the thrust direction is determined by the rotational position of the foot pedal as indicated by potentiometer 162. Thus, the boat will be steering straight ahead if the pedal is flat (i.e., horizontal), or steering right or left by an amount corresponding to the amount that the pedal is rotated down or up as indicated by the signal from potentiometer 161. Eventually, through experience, a user will learn that a particular foot position on pedal assembly 160 will always cause a particular orientation of prop motor 120, such that the user will not have to look at the orientation of the lower unit. This relationship will always be true whenever the user's foot is on pedal assembly 160, regardless of the steering mode. Thus, the system will appear to steer like a mechanical cable system when the user's foot is on pedal assembly 160.

Now, assume the user needs to make a small right (left) steering adjustment. As described above, this small adjustment may be difficult to make by rotating the pedal. To make this adjustment, the user lifts his foot off pedal assembly 160, and then taps the jog right (left) switch 245 (240) for a short duration. This results in the foot presence switch 230 being opened, and jog switch 245 (240) being actuated. In response to foot presence switch 230 being open, controller 230 is freed to command rotation of prop motor 120 without maintaining any fixed relationship between foot pedal 160 and prop motor 120 positions (since the user's foot is no longer on foot pedal assembly 160). In response to the right (left) jog switch 245 (240) being actuated, controllers 265 and 300 actuate steering motor 130 to slowly steer prop motor 120 to the right (left) as long as switch 245 (240) is held, thereby allowing fine adjustments to be easily made. At this point, the direction of prop motor 120 can be desynchronized from the position of foot pedal assembly 160. However, if a user replaces his foot on pedal assembly 160, foot presence switch 230 transmits a signal to controllers 265 and 300 that the user wants feedback steering again and causes controllers 265 and 300 to resynchronize or re-register by moving prop motor 120 into the position corresponding to the position of foot pedal assembly 160. By re-registering, a user need not learn that the direction of prop motor 120 was offset by X degrees from the pedal position as indicated by potentiometer 161. Thus, the following rule applies: If an operator's foot is on pedal assembly 160, the steering system will maintain a fixed relationship between foot pedal position and prop motor 120 position (similar to the fixed relationship of a cable steering system caused by the fixed mechanical linkages). If the foot is not on pedal assembly 160, synchronization may be lost due to the use of momentary right 245 and momentary left jog switch 240 which allow fine adjustments to be easily made. Note that the user is not likely to care about the loss of synchronization when his foot is not on the pedal because he is not using the pedal.

With respect to the steering system, the integration of different trolling motor steering modes (e.g., manual steering, auto pilot, depth tracking, GPS path tracking) into a single trolling motor system is made possible.

A user may use mode select switch 235 to toggle between these modes. In manual steering mode, system 100 generates steering commands based on foot pedal assembly 160 and jog switch 240 and 245 positions, as described above. In auto pilot mode, system 100 operates as in manual steering mode provided that the user's foot is on foot pedal assembly 160 (as indicated by foot presence switch (sensor) 230. When a user's foot is removed from pedal assembly 160, controllers 265 and/or 300 store the bearing and maintain the stored bearing using auto pilot compass circuit 305. Also, in the auto pilot mode, the user may still opt to use the two jog switches 240 and 245 to manually make fine bearing adjustments and then, when the user's foot is removed from the respective jog switch 240 or 245, controllers 265 and/or 300 are configured to remember the adjusted bearing and maintain that bearing. In depth tracking mode, system 100 again operates as in the manual steering mode, as the user steers to a desired depth in parallel to a structure (e.g., a reef with his foot on pedal 160, but, when the user's foot is removed, the controller locks onto the present depth and attempts to track that depth. Also, in depth tracking mode, pressing jog switches 245 or 240 may be used to change the tracking, with the new depth found after the foot is removed from jog switches 240 or 245 is then tracked by the depth tracking control. In the GPS path tracking mode, system 100 again operates as in manual steering mode provided that the user's foot is on pedal assembly 160. When a user's foot is removed from pedal assembly 160, controller 265 and 300 command prop motor 120 to follow a predefined path. Therefore, as long as a user's foot is on pedal assembly 160, prop motor 120 direction is synchronized with the foot pedal position. Once a user's foot is removed and a change in steering occurs based on the selected mode (e.g., jog right or left, hold a bearing, hold a depth or steer between way points along a path), synchronization may be lost until such time as the user puts his foot back on the pedal (even without moving the pedal), at which point the system resynchronizes with prop motor 120. Therefore, foot presence switch 230 in foot pedal assembly 160 is used to help integrate the modes.

While the detailed drawings, specific examples, and particular formulations given describe exemplary embodiments, they serve the purpose of illustration only. The materials and configurations shown and described may differ depending on the chosen performance characteristics and physical characteristics of the trolling motor system and its associated electronics. For example, the type of processors or software used may differ. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A steering control system for an electric trolling motor comprising:
   a steering actuator assembly, including at least one steering actuator, the steering actuator configured to provide open loop and closed loop command signals; and
   a controller, configured to receive command signals from the steering actuator, and the controller configured to generate closed loop control signals when the controller is in a closed loop control mode.

2. The steering control system of claim 1, wherein the steering actuator assembly includes a foot pedal assembly.

3. The steering control system of claim 2, wherein the foot pedal assembly includes a foot pedal.

4. The steering control system of claim 1, wherein the controller may be switched between an open loop mode and a closed loop mode by at least one steering mode switch.

5. The steering control system of claim 4, wherein the at least one steering mode switch includes a manual steering switch.

6. The steering control system of claim 4, wherein the at least one steering mode switch includes an auto pilot switch.

7. The steering control system of claim 1, wherein the steering actuator assembly includes a foot detection system.

8. The steering control system of claim 1, wherein the controller is configured to provide a signal to resynchronize the steering actuator with the trolling motor attitude.

9. The steering control system of claim 7, wherein the foot detection system includes a foot presence switch.

10. The steering control system of claim 7, wherein the foot detection system includes a potentiometer.

11. An electric trolling motor comprising:
    a propulsion unit configured to provide thrust and having a motor;
    a steering head, coupled to the propulsion unit and having a steering motor for steering the prop motor;
    a steering actuator assembly, including at least one open loop actuator;
    at least one steering mode switch configured to communicate changes between steering modes, the steering modes including at least one closed loop steering mode and at least one manual steering mode; and
    a controller, configured to receive signals from the open loop actuator, configured to receive signals from the at least one steering mode switch, and configured to generate control signals based on the states of the open loop actuator and the steering mode switch and applying the control signals to the steering motor.

12. The steering control system of claim 11, wherein the steering actuator assembly includes a foot pedal assembly.

13. The steering control system of claim 11, wherein the open loop actuator includes a foot pedal.

14. The steering control system of claim 11, wherein the at least one steering mode switch includes a manual steering switch and an auto pilot switch.

15. The steering control system of claim 11, wherein the at least one steering mode switch includes a depth tracking switch.

16. The steering control system of claim 11, wherein the at least one steering mode switch includes a global positioning system (GPS) tracking switch.

17. The steering control system of claim 11, wherein the steering actuator assembly includes a foot presence switch.

18. The steering control system of claim 11, wherein the controller provides a signal to the steering motor to resynchronize the steering with the manual controller, when the controller is switched to a manual steering mode.

19. A steering control system for an electric trolling motor comprising:
    a foot pedal assembly, including at least one foot pedal for manual steering;
    a foot presence detector configured to provide a signal representative of the presence of an operator's foot;
    at least one steering mode switch configured to communicate changes between steering modes, the steering modes including at least one closed loop steering mode and at least one manual steering mode; and
    a controller, configured to receive signals from the open loop actuator, configured to receive signals from the at least one steering mode switch, configured to receive a signal representative of the presence of an operator's foot, and configured to generate control signals based on the states of the open loop actuator and the steering mode switch.

20. The steering control of claim 19, further comprising:
    at least one jog switch configured to provide a jog signal to the controller.

21. The steering controller of claim 19, wherein the controller provides a resynchronization signal based on the position of the foot pedal and based on the state of the foot presence switch.

22. The steering controller of claim 19, wherein the controller provides a resynchronization signal based on the position of the foot pedal and based on the state of the at least one steering mode switch.

* * * * *